United States Patent
Gaides

(10) Patent No.: US 6,905,219 B2
(45) Date of Patent: Jun. 14, 2005

(54) DISPLAY DEVICE

(75) Inventor: Gary E. Gaides, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/143,440

(22) Filed: May 9, 2002

(65) Prior Publication Data

US 2003/0210535 A1 Nov. 13, 2003

(51) Int. Cl.$^7$ .................. G01D 11/28; F21V 11/02
(52) U.S. Cl. ............... 362/23; 362/290; 362/330; 362/354
(58) Field of Search .............. 362/23–30, 85, 362/290–292, 330, 331, 354, 489; 40/559–562, 564, 572, 577; 349/57, 61, 62, 66, 68, 110, 137

(56) References Cited

U.S. PATENT DOCUMENTS

| | | | |
|---|---|---|---|
| 3,524,789 A | | 8/1970 | Olsen |
| 3,653,138 A | | 4/1972 | Cooper |
| 3,863,251 A | * | 1/1975 | Gould et al. ............ 362/290 |
| 4,621,898 A | | 11/1986 | Cohen |
| 5,204,160 A | | 4/1993 | Rouser |
| 5,303,135 A | * | 4/1994 | Sprecher ............ 362/292 |
| 5,521,725 A | * | 5/1996 | Beeson et al. ............ 362/31 |
| 5,594,561 A | * | 1/1997 | Blanchard ............ 349/62 |
| 5,608,837 A | * | 3/1997 | Tai et al. ............ 349/62 |
| 5,671,028 A | | 9/1997 | Okano |
| 5,877,829 A | * | 3/1999 | Okamoto et al. ............ 349/110 |
| 5,964,514 A | | 10/1999 | Carter et al. |
| 6,152,580 A | | 11/2000 | Babuka et al. |
| 6,211,930 B1 | | 4/2001 | Sautter et al. |
| 6,238,065 B1 | * | 5/2001 | Jones ............ 362/354 |
| 6,364,497 B1 | * | 4/2002 | Park et al. ............ 362/31 |
| 6,421,103 B2 | * | 7/2002 | Yamaguchi ............ 349/61 |

FOREIGN PATENT DOCUMENTS

| | | | | |
|---|---|---|---|---|
| DE | 197 37 942 A1 | | 3/1999 | |
| JP | 06082625 A | * | 3/1994 | ............ G02B/5/32 |

OTHER PUBLICATIONS

Visual Products Division–3M, "Light Control Film Improves Contrast, Reduces Glare and Established Contolled Viewing Angles", 3M Industrial Optics Flyer.

* cited by examiner

Primary Examiner—Alan Cariaso
(74) Attorney, Agent, or Firm—William D. Miller

(57) ABSTRACT

A display device having an indicator interposed between two light controlling elements. The light controlling elements act in cooperation to restrict the viewing angle of the display in at least two directions. Only one of the light collimating elements restricts the angle of ambient light entering the display.

19 Claims, 2 Drawing Sheets

DISPLAY DEVICE

FIELD OF INVENTION

The present invention relates to displays, in particular displays used in applications where it is desired to control viewing angles.

BACKGROUND

A problem found in lighted instrument panel displays such as those in use in land vehicles, watercraft and aircraft is that light emitted by the display exits through a wide range of angles. Some of this light can strike nearby reflective surfaces such as a windshield or cockpit windows and be reflected back towards the operator of the craft. While sunlight generally prevents such reflections from being visible during the day, they are often clearly visible at night. Such reflections can create a dangerous situation by distracting the operator or even obscuring the operator's view.

In addition to reflections from light emitted by the display, ambient light reflected from the viewing surface of the display toward the operator can obscure the display itself. The ambient light source can be, for example, light entering through a nearby window or reflections from a white shirt worn by the operator.

To eliminate the above indicated reflections, various types of enclosures, shrouds, and the like have been used to at least partially enclose or surround the display to prevent ambient light from falling directly on the front surface of the display and to control the angle of light emitted by the display itself. An example of the use of an enclosure is an instrument panel with one or more recessed displays. An example of a shrouded display is an automobile dashboard having a top portion of the dashboard, or brow, extending out over the display to prevent light, from the sun for example, from entering through the windshield and reflecting from the viewing surface of the speedometer towards the driver. The brow is also said to help prevent reflections from indirect sources such as the "white shirt" reflection described above.

A disadvantage to the use of enclosures, shrouds, brows, and the like to control ambient or emitted light is the extra weight and depth added to the instrument panel. Automobile manufacturers, for example, seek to reduce overall vehicle weight in order to increase fuel efficiency. Reducing the dashboard depth contributes to reduced vehicle weight. Reducing the depth of an instrument panel can also provide more usable space in the surrounding area.

It is also known to provide random structure or texture to the face of the display for use with browless instrument panels to help prevent distracting reflections from the front surface of the display. Such structure does not address reflections caused by light emitted by the display.

Light collimating film, typically comprising a series of micro-louver elements, acts to restrict the viewing angle of light transmitted by the film. It has been used in front of a display, for example on a computer monitor screen, to restrict the viewing angle so that only the person directly in front of the screen may view the contents of the display. Light collimating film has been used behind a liquid crystal display for the same purpose, for example, in a publicly available automatic teller machine (ATM) display. Use of light control film in these instances, however, limits the viewing angle in only one direction.

The combination of two adjacent sheets of light collimating film with their collimating axes orthogonal to each other disposed in front of a display has been reported, but this combination is unsatisfactory as below.

SUMMARY OF INVENTION

The present invention comprises a display device having controlled illumination and viewing. In one embodiment a display element is combined with first and second light control elements. The first and second light control elements cooperatively limit the directionality of light from a light source illuminating the display element in at least two directions. Only one of the first and second light control elements limits the directionality of reflected ambient light illuminating the display.

In one particular embodiment, a display device is disposed between an illumination source and a viewer. The display device may include a display element such as an indicator. A first light collimating element is disposed between the indicator and the illumination source, and a second light collimating element is disposed in front of the indicator, for example, between the viewer and the indicator.

In yet another embodiment, the display device includes an analog display. The indicator may be a pointer-type indicator.

In still another embodiment, the display device includes a digital display. The indicator may be a digital indicator such as a liquid crystal display.

In a yet further embodiment, the display device comprises a passive display in which neither indicator nor indicia respond to external stimulus such as mechanical or electronic input.

DETAILED DESCRIPTION

Figure 1:
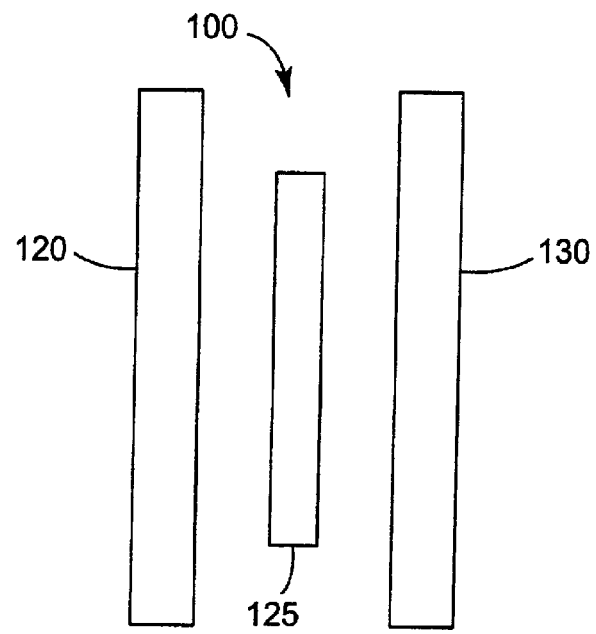
FIG. 1 depicts a general display device of the present invention in side view.

Where used herein, unless noted otherwise, the terms "in front of" and "forward" refer to relative positions proximal to or within the display or instrument panel which are toward the viewer, and the terms "behind" and "rearward" refer to relative positions proximal to or within the display or instrument panel which are away from the viewer.

The present invention is directed generally to a display device in which two light control elements operate cooperatively with a source of illumination to limit the directionality of light emitted by the display. The light control elements control the light at least two directions. One of the light control elements further limits the directionality of reflected ambient light entering the display. In one aspect, use of the display device can reduce or eliminate reflections from surfaces proximal to the display, for example, both above and to the side of the display, insofar as the directionality, or viewing angle, of light emitted by the display can be controlled in at least two directions. In another aspect, since the display device may limit the directionality of reflected ambient light entering the display in only one direction, the display may be viewed by ambient light while reducing or eliminating undesired reflections of the ambient light from the display itself. Limiting the directionality of the ambient light reflected from the display can also be used to provide a visual dead-front appearance as described below.

As described herein, the light control elements, as exemplified by light collimating films, are separated by the interposition of the display element or indicator. In contrast to previous approaches that merely combine two adjacent light collimating films in front of or behind the indicator, the present invention allows both ambient and backlit acceptable performance. When two light collimating films are adhesively joined together with a transparent optical adhesive such that the direction of the light collimating axis of one film is orthogonal to the direction of the light collimating axis of the other film, and this joined combination of films is disposed in front of a display means, the display is difficult to read in ambient light because of the reduced light transmission by the combined films. In use, such a display device would require constant backlighting of the display to ensure adequate visibility of the display and indicia behind the combined collimating films. Constant backlighting is expected to reduce the life of the illumination source and thereby incur added cost and inconvenience to the user. On the other hand, when the joined combination of films is disposed behind the indicator means, ambient light can reflect from the front surface of the indicator or indicia and result in at least a partial wash-out of the display.

In accordance with an embodiment of the present invention, an instrument panel display including the display device can be made which does not require an enclosure, shroud, brow, or the like, and yet effectively reduces undesired reflections due to light emitted by the display. The display device also effectively reduces undesired ambient light reflected from the surface of the display. This is important because ambient light is considered an important illumination source for many displays and therefore whatever means is used to prevent reflections must also allow sufficient ambient light into the display to illuminate it when needed without additional lighting being provided. A display in accord with one aspect of the present invention may be viewable both by transmitted light from an illumination source and by reflected ambient light alone.

FIG. 1 depicts a generic display device in accord with the present invention. The display device 100 comprises a first light control element 120, a second light control element 130, and a display element 125 interposed between the first and second light collimating films. As described above, the light control elements 120 and 130 cooperatively control ambient light to prevent or reduce unwanted reflections. One of the light control elements, closest to a view, for example, further serves to reduce ambient light reflection. A light source, not shown, may further be used to illuminate the display.

Figure 2:
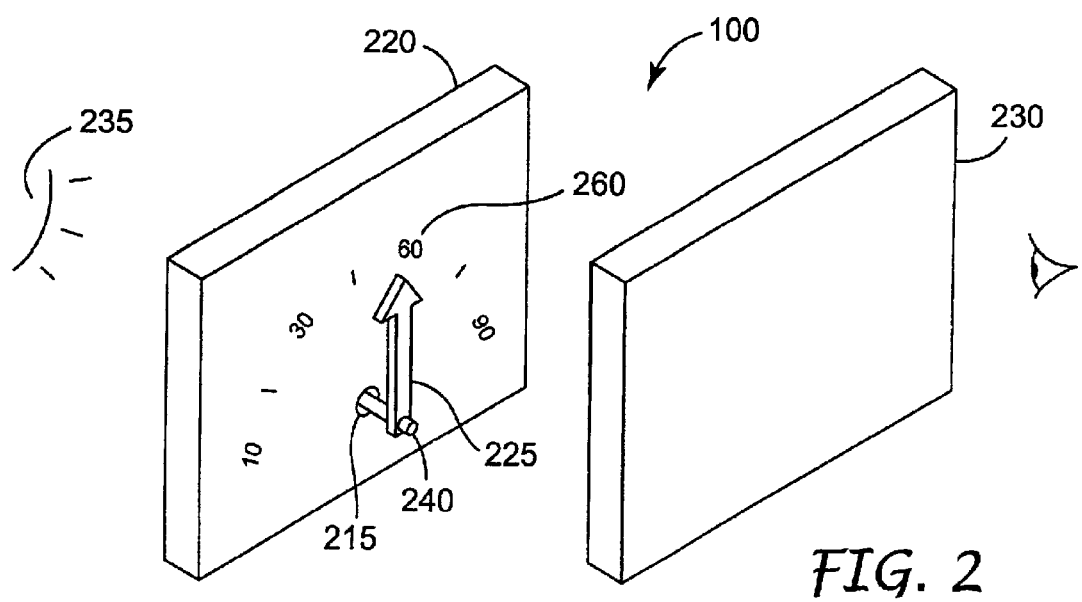
FIG. 2 shows one embodiment of the present invention in oblique view.

One particular embodiment in accord with an aspect of the present invention is shown in FIG. 2 which depicts an analog display device 200. Analog displays are well known and may be represented by pointer-type gauges such as speedometers, altimeters, oil pressure gauges, and the like. Pointer-type gauges generally have an indicator such as a pointer rotatably coupled to a mechanical or electromechanical actuation device. In FIG. 2, a display element or indicator 225 is illustrated as a pointer-type needle and is shown attached to one end of a rotatable coupling shaft 240. The other end of the shaft 240 engages an indicator actuation mechanism such as a mechanical or electromechanical gauge motor (not shown). The shaft 240 passes through an aperture 215 in the first light collimating film 220.

The illumination source 235 serves to illuminate the display device. The illumination source may be one or more incandescent lamps, fluorescent lamps, light emitting diodes, electroluminescent panels, and the like. The illumination source 235 is typically disposed behind the display device 200 such that light emitted by the illumination source 235 is transmitted by the first collimating film 220, illuminates the indicator 225, is transmitted by the second collimating film 230, toward the viewer. Also contemplated, however, are illumination sources such as lightguide backlights typically used for liquid crystal displays or fiber optic light conduits each of which permit the actual illumination source to be disposed other than behind the display device.

Interposed between the indicator 225 and the illumination source 235 is a first light collimating film 220 with a first collimating axis oriented in a first direction. Disposed in front of the indicator 225 is a second light collimating film 230 with a second collimating axis oriented in a second direction. In one particular embodiment, the orientation of the light collimating axis of the first collimating film 220 is substantially different from the orientation of the light collimating axis of the second collimating film 230. When such a display is backlit, light emitted by the illumination source 235 is collimated in first direction by the first collimating film 220, the collimated light illuminates the indicator and is then collimated in a second direction by the second collimating film 230, reducing the viewing angle of the emitted light. Generally, the most restrictive viewing angle side-to-side and top-to-bottom will be obtained when the collimating axis of the first collimating film 220 is oriented at approximately 90 degrees with respect to the collimating axis of the second collimating film 230. It should be noted that as used herein, collimate refers to reducing the viewing (or cone) angle of light and does not require the light to be perfectly collimated.

When ambient light strikes the face of the display, some of the ambient light enters through the louvers of the second collimating film 230 to illuminate the indicator 225 thereby permitting the viewer to view the display even in the absence of backlighting.

For the purpose of illustration, one or more markings, or indicia 260, are shown disposed on the forward surface of the first light collimating film 220 in FIG. 2. Exemplary indicia are numbers representing miles per hour on a speedometer, feet on an altimeter, or graphics such as a symbol for water on a water temperature gauge or a symbol for oil on an oil pressure gauge and the like.

Disposition of indicia is not limited to a surface of the first collimating film 220 but may be on any surface. For example, Indicia may be disposed on a surface behind the pointer or on a surface in front of the pointer depending on the desired appearance of the display. Indicia disposed in front of the indicator 225, for example on a surface of the second light collimating film 230, will appear to be floating in space relative to the indicator. Alternatively, indicia disposed on the surface of a first collimating film 220 will appear to be behind the indicator 225. Indicia disposed on the front surface of the second collimating film 230 will be visible at all times by reflected or transmitted light whereas indicia disposed on the rearward surface of the second light collimating film 230 will tend to be visible only by transmitted light and, depending on the orientation of the collimating axis of film 230, may only be visible to the operator directly in front of the display.

For the purpose of visibility, the indicia are preferably opaque, but translucent indicia and even transparent indicia rendered visible within the display by contrasting color or texture, for example, may be used. Indicia may be applied by any of many methods. For example, indicia may be hot-stamped, printed via silk-screen or other printing techniques, embossed, or applied with adhesive onto a display surface.

Light collimating films are well known. One type of light control film, for example, is a thin plastic sheet incorporating closely-spaced, alternating micro-louvers, or collimating elements, of light transmissive and light absorbing material. A second type of light control film, for example, is a generally transparent, thin plastic sheet provided with light collimating structures on one or both surfaces of the film.

Light control films have been used on computer screens and other fixed displays to protect the privacy of the user and to aid contrast enhancement. Louvers having a light collimating orientation in a generally vertical direction limit the side-to-side viewing angle of the display. Louvers having a light collimating orientation in a generally horizontal direction limit the top-to-bottom viewing angle of the display. Furthermore, light control films help to reduce reflections and glare from the display and to increase contrast by physically blocking ambient light from reaching the display screen. Examples of light collimating films suitable for use in the present invention are Light Control Film sold by 3M, St Paul, Minn.; louver films made by the skiving process described in U.S. Pat. No. 3,524,789; and light transmissive films which have grooves or channels that are filled or coated with a light absorbing material as described, for example, in U.S. Pat. No. 5,204,160.

Figure 3:
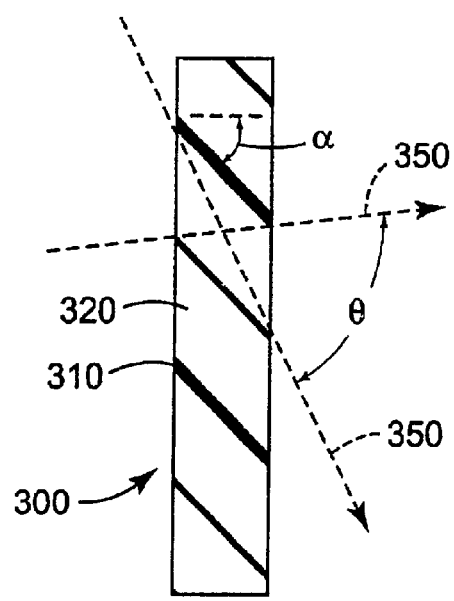
FIG. 3 shows a cross section of a light collimating film.

For the purpose of explanation but not by way of limitation, one particular collimating film is illustrated in FIG. 3. FIG. 3 depicts a greatly enlarged cross section, not to scale, of a sheet of 3M Light Control Film 300 comprising alternating light transmissive louver elements 320 and light absorbing louver elements 310. Light rays 350 transmitted by the film are collimated by louver elements toward a direction determined by the louver angle $\alpha$ (alpha). As will be appreciated by those skilled in the art, the collimated light has a maximum viewing angle $\theta$ (theta) determined by louver angle, distance between louver elements, thickness of the film, and refractive index of the film in accord with Snell's law. Thus, a narrower viewing angle can be obtained, for example, by increasing the film thickness, by decreasing the thickness of the light transmissive louver elements, or a combination of both.

The visibility of the display, whether by transmitted light or reflected ambient light, is also a function of the optical transmission of the light collimating films. The degree of light transmission of the film is, in part, a function of the distance between light absorbing louver elements, that is, the thickness of the light transmissive elements of the film. The greater the distance between absorptive louver elements, the more light transmission through the collimating film. A more transmissive collimating film will permit more ambient light to enter through the forward collimating film to illuminate the indicator and will permit more light to be transmitted from the illumination source behind the display through the display towards the viewer.

It will be appreciated that by using various combinations of louver angle and collimating axis in the two light collimating films in a display device, the direction and viewing angle of light emitted by the display device can be controlled. For example, in an instrument panel having multiple displays, light emitted from each display can be directed at a stationary operator position regardless whether the display, gauge or meter is above, below or to the side of the operator by proper choice of collimating axis, louver angle and degree of transmissiveness especially of the second collimating film.

Referring again to FIG. 2, in one construction of a display device suitable for use in a browless automobile dashboard, the first light collimating film 220 having a louver angle of about 0 (zero) degrees is preferably oriented with its collimating axis in a generally vertical orientation. The second light collimating film 230 may be oriented with its collimating axis in a generally horizontal direction. Collimation of light by the first film 220 reduces sideways emitted light thereby tending to eliminate reflections from reflecting surfaces to the sides of the display. Collimation of light transmitted by the second film 230 reduces vertically emitted light thereby tending to eliminate reflections from surfaces above and/or below the display but at the same time would allow a passenger in the vehicle to view at least a portion of the display from a position to the side of the display. In addition, the louvers of second collimating film 230 help prevent ambient light from entering the display and washing out the appearance of indicator means 225 or indicia 260.

Another advantage of a display in accordance with one embodiment of the present invention is that, by suitable choice and orientation of light collimating films, especially the second light collimating film 230, the display may be viewable by transmitted light from illumination source 235 and also by ambient, reflected light alone.

A display in which the indicator and indicia are visible only by transmitted light but which are invisible by reflected light is known to have a visual dead-front appearance. A black, visual dead-front display is considered to have a distinctive, stylish, aesthetically appealing appearance. Such an appearance can be achieved in a display in accordance with one aspect of the present invention. Using the embodiment shown in FIG. 2 as an example, when second collimating film 230 is disposed with its collimating axis in a vertical orientation and the viewing angle of second collimating film 230 is sufficiently narrow, indicator 225 and indicia 260 will not be visible outside of the viewing angle of second collimating film 230. In an automobile dashboard display, for example, this display would be visible to the driver but would present a visual dead-front appearance to a person seated in the front passenger seat.

By contrast, however, when second collimating film 230 of the display of FIG. 2 has a sufficiently large viewing angle or if second collimating film 230 is disposed with its collimating axis in a horizontal orientation, it is more likely that indicator 225 and indicia 260 will be visible by both reflected ambient and transmitted light not only to the driver but also to a passenger.

Figure 4:
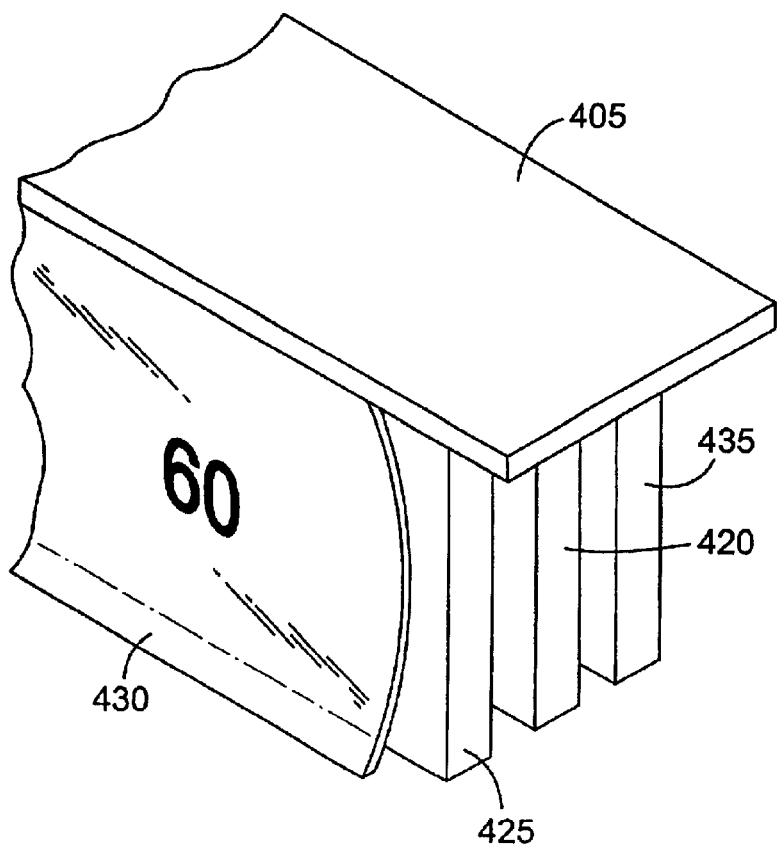
FIG. 4 shows a second embodiment of the present invention in oblique view.

FIG. 4 depicts another embodiment in which the display 400 comprises a digital indicator 425. In this particular embodiment, an illumination source 435 is mounted in a browless automobile dashboard 405. The indicator 425 is a liquid crystal display (LCD) illuminated by a backlight such as an electroluminescent (EL) panel 435 for example. Interposed between the LCD 425 and the EL panel 435 is a first light collimating film 420. A second light collimating film 430 is disposed between the LCD 425 and the viewer. In this particular embodiment, a flexible second light collimating film 430 is shown disposed in a concave manner towards the viewer. In this concave configuration of the second light collimating film 430, ambient light incident on the front of the display, for example, ambient light reflected toward the display from a white shirt worn by the viewer, will tend to be reflected from the display in a direction other than back toward the viewer thus reducing white shirt reflections.

The use of a flexible light collimating film can be advantageous, for example, for further controlling the viewing angle of the display or for controlling the illumination of the display. It will be readily appreciated that flexure of a light collimating film may affect the relative orientation of the louver elements. For example, when a light collimating film having louver elements generally parallel to each other and generally perpendicular to the thickness of the film is flexed about an axis generally parallel to the light collimating axis of the film, the planes of adjacent louver elements within the flexed film will be no longer generally parallel to each other but instead will be generally parallel to a radius of the flex curvature. Consequently, the viewing angle for light transmitted from the concave to the convex side of the flexed film will be increased. Similarly, the viewing angle for light transmitted from the convex side to the concave side of the film will be decreased. In a light collimating film flexed about an axis generally perpendicular to the light collimating axis of the film, the planes of adjacent louver elements will remain generally parallel to each other, and the viewing angle of the film will remain unchanged. A film having a wider viewing angle for light exiting the film also has a wider entry angle for ambient light entering through the film. Thus it is possible to introduce curvature into one or more light collimating films, for example by bending or molding of the film, in a display according to the present invention in order to control specific aspects of the viewability or illumination of the display. The curvature need not be on the entire film but may also be introduced to local areas of the film to provide localized light control.

As in the previously described embodiment of the invention, at least a portion of the light emanating from the illumination means 435 will be transmitted and collimated by the first collimating film 420, pass through the transmissive areas of the LCD indicator 425, and be collimated by the second collimating film 430.

In another embodiment of the present invention, the display device can comprise both an analog display and a digital display. An example of this embodiment is a speedometer having a pointer indicator indicating speed in miles per hour in combination with a digital indicator displaying total miles driven.

In a yet further embodiment, a display device is passive. For example, a passive indicator in which neither indicator nor indicia respond to an external stimulus such as mechanical or electronic input. In an exemplary passive display device in accord with the present invention, the indicator is, for example, a signage element such as a generally light transmissive substrate having affixed thereupon generally opaque indicia or alternatively a generally opaque substrate having generally light transmissive areas.

Various modifications and alterations to this invention will be apparent to those skilled in the art without departing from the scope and spirit of this invention. For example, one or more color filters within the display or colored louver elements in the light collimating film may be used to alter the appearance of the display device. An additional transmissive film including indicia may be disposed within the display, for example between the first collimating film and the indicator or between the indicator and the second collimating film. One or more surfaces of any of the aforementioned films including the light collimating films may be coated or treated to provide antiglare, antireflection, soil-resistant or abrasion-resistant properties to the film. Any combination of these coatings or treatments may be used as desired or required for a particular display application. One or more components of the display may be enclosed in a frame or housing.

It should be understood that this invention is not intended to be unduly limited by the illustrative embodiments and examples set forth herein, and that such examples and embodiments are presented by way of example only with the scope of the invention intended to be limited only by the claims set forth herein as follows.

What is claimed is:

1. A display device comprising:
   a first light collimating film having a first collimating orientation and disposed to limit the directionality of light in a first direction but not in a second direction, the second direction being different than the first direction;
   a second light collimating film having a second collimating orientation and disposed to limit the directionality of light in the second direction but not in the first direction; and
   at least one display element disposed between the first and second light collimating films.

2. The display device of claim 1 wherein said display element includes an analog indicator, a digital indicator, a passive display or any combinations thereof.

3. The display device of claim 1 wherein the first collimating orientation of the first collimating film is substantially different from the second collimating orientation of the second collimating film.

4. The display device of claim 3 wherein the difference between the first collimating orientation and the second collimating orientation is about 90 degrees.

5. The display device of claim 1 wherein either light collimating film comprises alternating louver elements of light absorbing and light transmissive material.

6. The display device of claim 1 wherein at least one surface of the first and second light collimating films comprises an antiglare surface, an antireflective surface, an antisoiling surface, a scratch-resistant surface or any combination thereof.

7. The display device of claim 1 wherein the first direction is normal to the second direction.

8. A display comprising:
   an illumination source;
   a first light collimating film having a first collimating orientation and disposed to limit the directionality of light in a first direction;
   a second light collimating film having a second collimating orientation and disposed to limit the directionality of light in a second direction different than the first direction; and,
   at least one display element disposed between the first and second collimating films, such that light emitted by the illumination source is collimated by the first collimating film, illuminates the display element, and is then collimated by the second collimating film.

9. The display of claim 8 wherein said display element includes an analog indicator, a digital indicator, a passive display, or any combination thereof.

10. The display of claim 8 wherein the first collimating orientation of the first collimating film is substantially different from the second collimating orientation of the first collimating film.

11. The display of claim 10 wherein the difference between the first collimating orientation and the second collimating orientation is about 90 degrees.

12. The display of claim 8 wherein either light collimating film comprises alternating louver elements of light absorbing and light transmissive material.

13. The display of claim 8 further characterized by the indicator being visible by ambient light alone.

14. The display of claim 8 wherein at least one surface of the first and second light collimating films comprises an antiglare surface, an antireflective surface, an antisoiling surface, a scratch-resistant surface or any combination thereof.

15. The display device of claim 8 wherein the first light collimating film does not limit directionality of light in the second direction, and wherein the second light collimating film does not limit the directionality of light in the first direction.

16. An instrument panel having at least one display device wherein said device comprises:
   a first light collimating film having a first collimating orientation and disposed to limit the directionality of light in a first direction;
   a second light collimating film having a second collimating orientation and disposed to limit the directionality of light in a second direction different than the first direction; and
   at least one instrument panel display element disposed between the first and second light collimating films.

17. The instrument panel of claim 16 wherein said panel is an automobile dashboard.

18. The instrument panel of claim 17 wherein said dashboard is browless.

19. The instrument panel of claim 16 wherein the first light collimating film does not limit the directionality of light in the second direction, and wherein the second light collimating film does not limit the directionality of light in the first direction.

* * * * *

UNITED STATES PATENT AND TRADEMARK OFFICE
CERTIFICATE OF CORRECTION

PATENT NO. : 6,905,219 B2
DATED : June 14, 2005
INVENTOR(S) : Gaides, Gary E.

It is certified that error appears in the above-identified patent and that said Letters Patent is hereby corrected as shown below:

Title page,
Item [56], References Cited, OTHER PUBLICATIONS, "Visual Products Division - 3M" reference, delete "Establishes Contolled" and insert in place therefore
-- Establishes Controlled --.

Signed and Sealed this

Twenty-ninth Day of November, 2005

JON W. DUDAS
*Director of the United States Patent and Trademark Office*